(12) United States Patent
Tan et al.

(10) Patent No.: US 8,480,285 B2
(45) Date of Patent: Jul. 9, 2013

(54) LIGHT GUIDE PLATE ASSEMBLY FOR PORTABLE ELECTRONIC DEVICE

(75) Inventors: Zheng-Ping Tan, Shenzhen (CN); Kuan-Hung Chen, Shindian (TW); Shi-Feng Wang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 281 days.

(21) Appl. No.: 12/979,090

(22) Filed: Dec. 27, 2010

(65) Prior Publication Data
US 2012/0020116 A1  Jan. 26, 2012

(30) Foreign Application Priority Data
Jul. 21, 2010 (CN) .............................. 201010232996

(51) Int. Cl.
*F21V 8/00* (2006.01)
(52) U.S. Cl.
USPC ......... 362/615; 362/627; 362/23.03; 362/633

(58) Field of Classification Search
USPC .................. 362/23, 612–616, 27, 627, 23.03, 362/633
See application file for complete search history.

(56) References Cited

U.S. PATENT DOCUMENTS
7,503,683 B2 * 3/2009 Liu ............................... 362/616
7,988,310 B2 * 8/2011 Yamada et al. ............... 362/26

FOREIGN PATENT DOCUMENTS
| CN | 2831182 Y | 10/2006 |
| CN | 1873494 A | 12/2006 |
| CN | 1909569 A | 2/2007 |
| CN | 101542196 A | 9/2009 |

* cited by examiner

*Primary Examiner* — Stephen F Husar
*Assistant Examiner* — James Cranson, Jr.
(74) *Attorney, Agent, or Firm* — Altis Law Group, Inc.

(57) ABSTRACT

A light guide plate includes a light source, a first light guide area and a second light guide area. The first light guide area and the second light guide area are formed by a single light guide plate. The first light guide area defines a notch, and the light source is positioned in the notch. A plurality of microdots are provided on one side of the second light guide area, and the microdots uniformly guiding light from the light source to the second light guide area.

7 Claims, 4 Drawing Sheets

LIGHT GUIDE PLATE ASSEMBLY FOR PORTABLE ELECTRONIC DEVICE

BACKGROUND

1. Technical Field

The present disclosure relates to light guide plate assemblies and, particularly, to a light guide plate assembly for a portable electronic device.

2. Description of Related Art

In portable electronic devices, liquid crystal displays (LCDs) and keypads need respective light sources and light guide plates for illumination. Using many light sources and plates may make further miniaturization of devices difficult. In addition, using multiple light sources and light guide plates is costly.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present light guide plate assembly. Moreover, in the drawings, like reference numerals designate corresponding parts throughout the several views.

DETAILED DESCRIPTION

Figure 1:
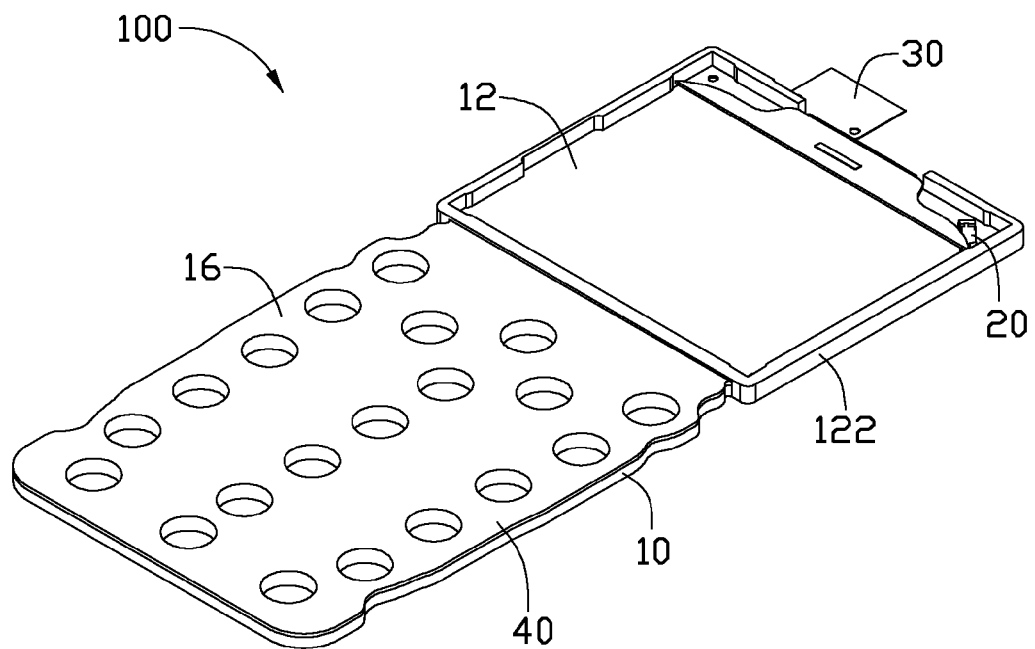
FIG. 1 is an assembled view of a light guide plate assembly according to an exemplary embodiment.

Referring FIG. 1, a light guide plate assembly 100 includes a light guide plate 10, a light source 20, a flexible printed circuit board 30, and a film 40. The film 40 is attached to one side of the light guide plate 10. The light source 20 is positioned on the board 30 for illuminating the light guide plate 10.

Figure 2:
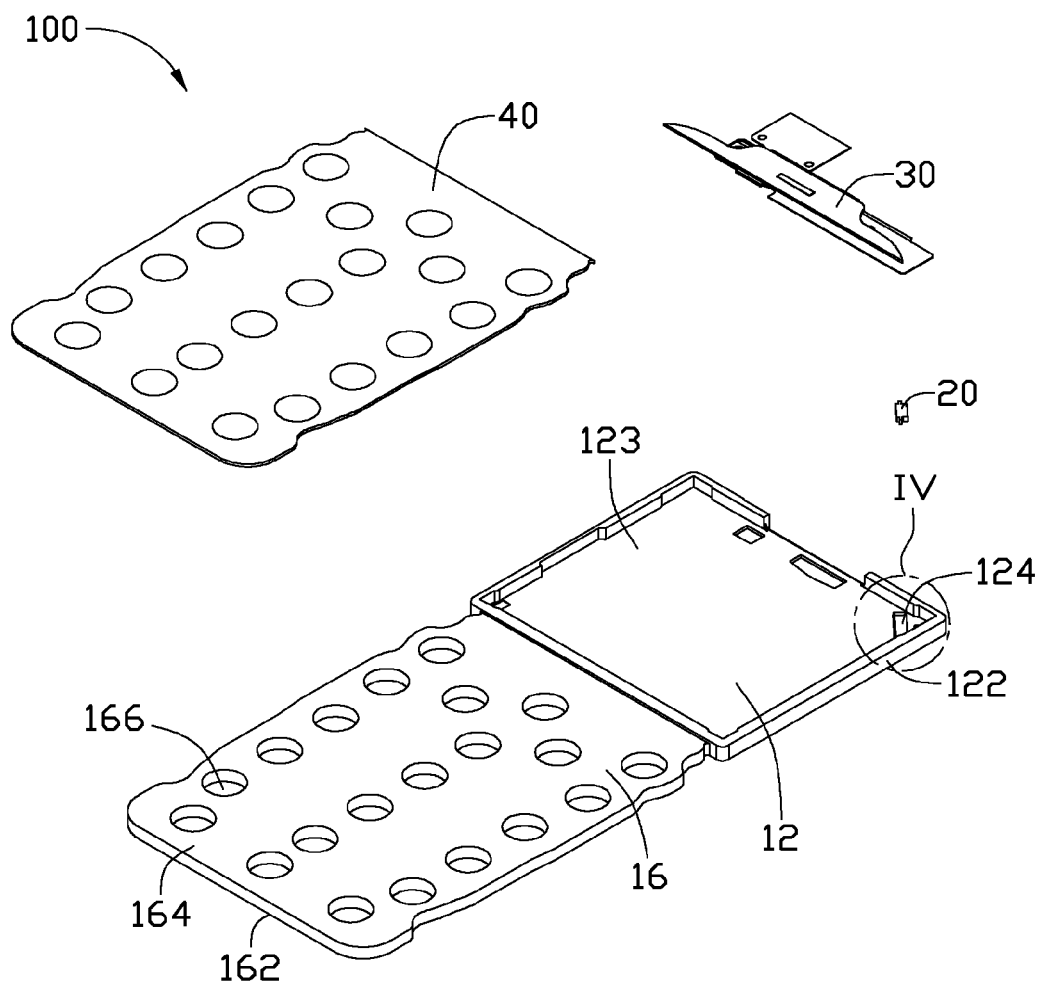
FIG. 2 is an exploded, isometric view of the light guide plate assembly shown in FIG. 1.
Figure 3:
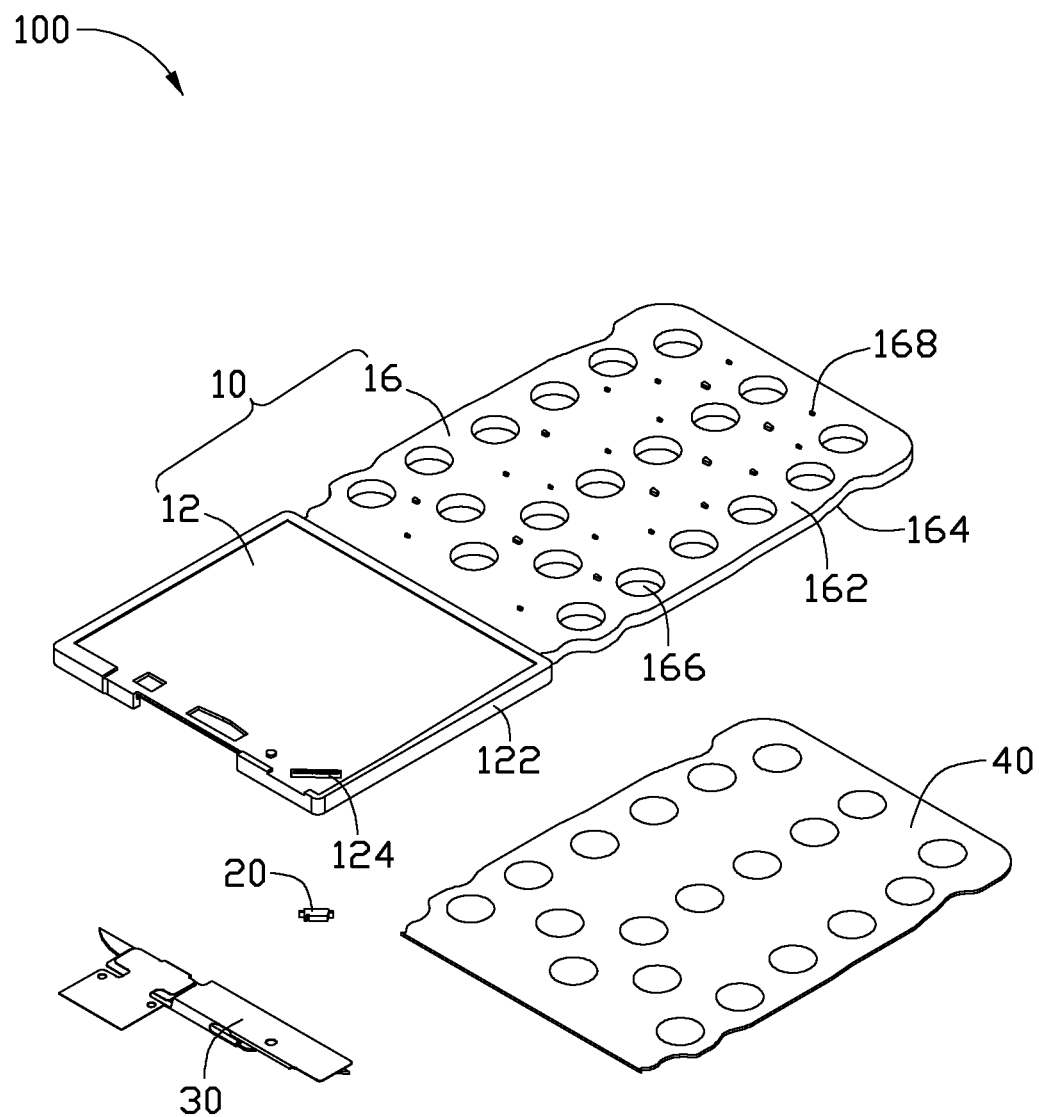
FIG. 3 is similar to FIG. 2, but viewed from another aspect.

Referring to FIGS. 2 and 3, the light guide plate 10 is made of a transparent material such as glass or plastic. The plastic material can be any of acrylic, polyvinylchloride resin (PVC), polycarbonate (PC), polystyrene (PS), and polypropylene (PP). The light guide plate 10 includes a first light guide area 12 and a second light guide area 16 integrally formed together. A rectangular frame 122 is positioned on the first light guide area 12, and defines a receiving cavity 123. The receiving cavity 123 is used for accommodating a display module of a portable electronic device.

Figure 4:
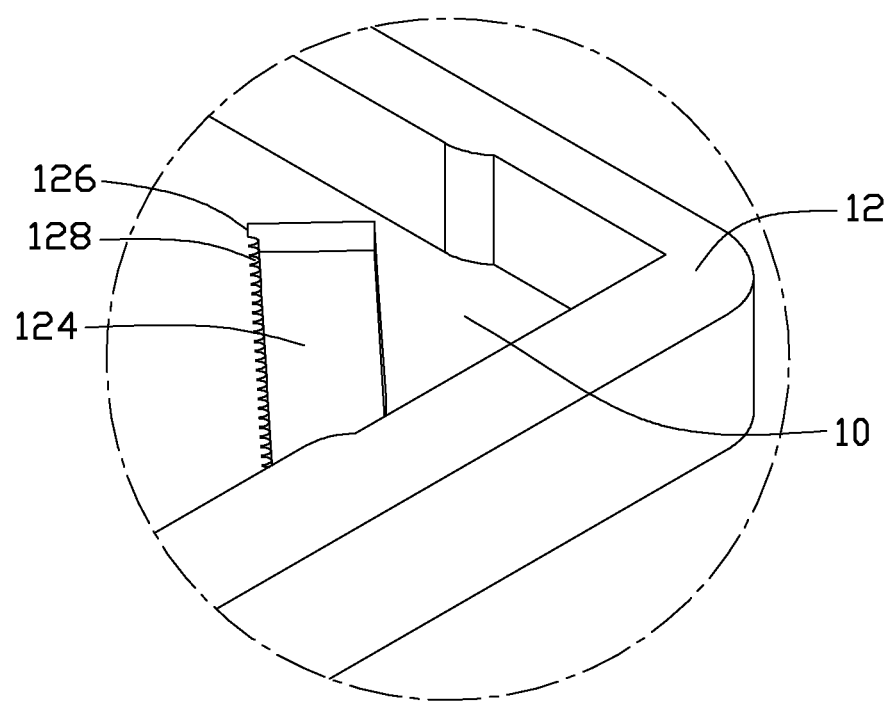
FIG. 4 is an enlarged view of the circled portion IV in FIG. 2.

The first light guide area 12 is used for illuminating the display module. A corner of the frame 122 defines a notch 124 for accommodating the light source 20. Referring to FIG. 4, a sidewall 126 is formed in the notch 124. A plurality of projections 128 are formed on the sidewall 126. The projections 128 are substantially semi-cylindrical and form a wavelike surface, and are configured for refracting the light beams of the light source 20 to the light guide plate 10 in a uniform manner.

The second light guide area 16 is used for illuminating a keypad of the portable electronic device. The second light guide area 16 includes a first surface 162 and a second surface 164. The second light guide area 16 includes a plurality of microdots 168 arranged in a pattern on the first surface 162.

The microdots 168 on the first surface 162 of the transparent plate 10 can scatter and reflect incident light beams, eliminating or nearly eliminating internal reflection enabling uniform light emittance from the second surface 164. In an exemplary embodiment, the microdots 168 are generally hemispherical protrusions, and are made of high refractive material such as titanium dioxide or barium sulfate. The protrusions may be formed by screen printing. The density of the microdots 168 increases with their distance from the light source 20 to ensure uniform light emission. The microdots 168 can reflect or refract the light beams emitting from the first surface 162 to the second surface 164 of the transparent plate 10. The second light guide plate 16 defines a plurality of apertures 166. When the keys are located within the apertures 166, light can readily be directed into the keys from the light guide plate 10.

Referring to FIG. 4, the light source 20 may be a light-emitting diode (LED), and is received in the notch 124. The light source 10 faces the projections 128. The board 30 is disposed at one side of the first light guide area 12. The light source 20 is electrically connected to the board 30 for illuminating the light guide plate 10.

The film 40 is attached to the second surface 164 of the second light guide area 16, can diffuse the light beams emitting from the second surface 164 of the light guide plate 10, in order to achieve uniform brightness. In an exemplary embodiment, the film 40 is made of an organic material such as polymethyl methacrylate (PMMA), or metallocene cyclic olefin copolymer (MCOC). Since the light guide plate 10 and the film 40 are of different materials, the brightness uniformity of the second light guide area 16 is greatly improved.

In use, the light source 20 emits light in notch 124. The emitted light is refracted by the projections 128 on the sidewall 126 to enter the light guide plate 10. One part of the light enters the first light guide area 12 for illuminating the display, and the other part of the light enters the second light guide area 16 for illuminating the keypad. Moreover, the microdots 168 on the first surface 162 and the film 40 make the light beams uniformly illuminate the second light guide area 16. The light guide plate assembly 100 only uses a single light guide plate for illuminating the display and the keypad. The structure of the portable electronic device becomes simpler, and the costs are greatly reduced.

It is believed that the present embodiments and their advantages will be understood from the foregoing description, and it will be apparent that different changes may be made thereto without departing from the spirit and scope of the disclosure or sacrificing all of its material advantages, the examples hereinbefore described merely being preferred or exemplary embodiments of the disclosure.

What is claimed is:

1. A light guide plate assembly, comprising:
   a light source;
   a single light guide plate including a first light guide area and a second light guide area, the first light guide area including a frame and defining a notch, the frame defining a receiving cavity for receiving and illuminating a display, the second light guide area illuminating a keypad; the light source positioned in the notch, a plurality of microdots provided on one side of the second light guide area, the microdots uniformly guiding light from the light source to the second light guide area.

2. The light guide plate assembly as claimed in claim 1, further comprising a film, wherein the film is attached to an opposite side of the second light guide area.

3. The light guide plate assembly as claimed in claim 1, wherein a sidewall is formed in the notch, a plurality of projections are formed on the sidewall, and the projections are opposite to the light source.

4. The light guide plate assembly as claimed in claim 3, wherein the projections are wavelike, and each projection is substantially semi-cylindrical.

5. A light guide plate comprising:
- a first light guide area and a second light guide area formed by a single light guide plate, a plurality of microdots provided on one side of the second light guide area, and the microdots uniformly guiding light to the second light guide area;
- wherein the first light guide area defines a notch with a sidewall, a plurality of projections are formed on the sidewall, and the projections are opposite to the light source.

6. The light guide plate as claimed in claim 5, further comprising a film, wherein the film is attached to an opposite side of the second light guide area.

7. The light guide plate as claimed in claim 5, wherein the projections are wavelike, and each projection is substantially semi-cylindrical.

* * * * *